Jan. 14, 1958  S. K. HIGHT  2,819,856
STABILIZING APPARATUS FOR BOMBS
Filed Sept. 27, 1955
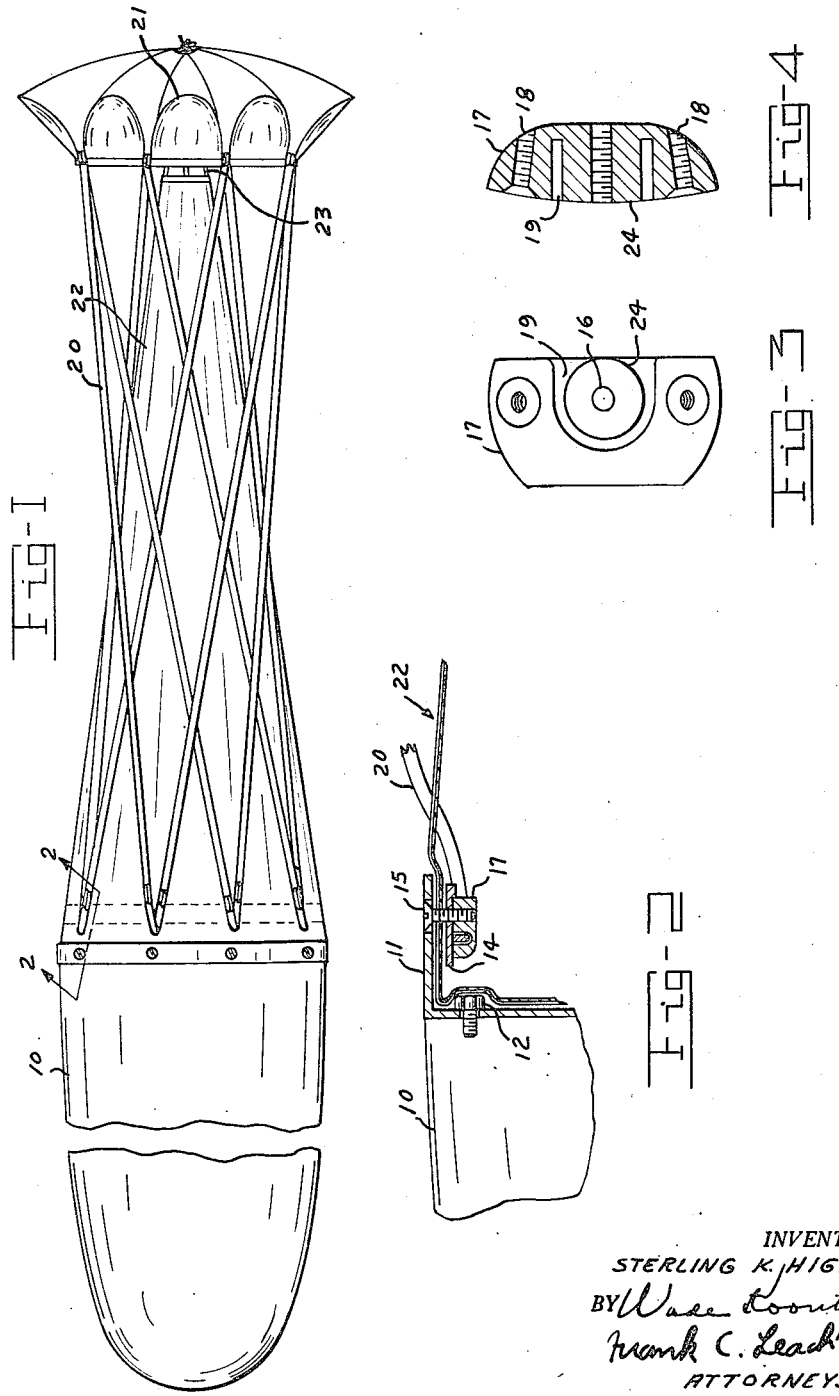
INVENTOR.
STERLING K. HIGHT
BY
ATTORNEYS

United States Patent Office 2,819,856
Patented Jan. 14, 1958

2,819,856

STABILIZING APPARATUS FOR BOMBS

Sterling K. Hight, Dayton, Ohio, assignor to the United States of America as represented by the Secretary of the Air Force Application September 27, 1955, Serial No. 537,074

5 Claims. (Cl. 244—138)

(Granted under Title 35, U. S. Code (1952), sec. 266)

The invention described herein may be manufactured and used by or for the United States Government for governmental purposes without payment to me of any royalty thereon.

This invention relates to a stabilizing apparatus for bombs and, more particularly, to light weight inflatable members for stabilizing the flight of bodies dropped from aircraft.

The wake conditions behind bombs and other bodies dropped from aircraft with blunt or abruptly boat-tail sterns are not ideal for the operation of stabilizing parachutes. One manner of producing the desired streamlining behind bombs has been by using metal fairings but this produces an increase in bulk and weight that is undesirable.

An object of this invention is to provide a stabilizing apparatus for bombs that adds practically no weight to the bomb.

Another object of this invention is to provide a device for use on parachute stabilized bombs that improves the airflow conditions in the region of the parachute.

This invention relates to a device adapted to be dropped from aircraft including a body portion and an open ended expansible member secured to one end of the body. A parachute is also secured to the same end of the body and extends a greater distance from the end of the body than the expansible member whereby air is directed into the expansible member from the parachute to inflate the expansible member during the body's fall to stabilize the body's fall.

The attached drawing illustrates a preferred embodiment of the invention, in which Fig. 1 is an elevational view of the apparatus embodying the present invention;

Fig. 2 is a cross-sectional view of a portion of Fig. 1 taken along line 2—2 of Fig. 1;

Fig. 3 is an elevational view of a retainer member employed in the present invention; and Fig. 4 is a sectional view of the member of Fig. 3.

Referring to the attached drawing and particularly to Figs. 1 and 2, there is shown a body 10 adapted to be dropped from an aircraft such as a bomb, for example. An annular angle member 11 is secured to the blunt or rear end of the bomb 10 by suitable means such as bolts 12. A ring 14 is fastened to a flange of the angle member 11 by suitable threaded fastening means such as screws 15. It will be observed that each of these screws 15 is also threaded into an opening 16 in a retainer or anchor member 17. These retainer members 17 are spaced about the ring 14 and are secured thereto by suitable means such as screws (not shown) that are threaded into openings 18 in the retainer member.

Each of the retainer members 17 has a U-shaped groove 19 with a stud portion 24 therein about which the looped end of one of the parachute shroud lines 20 is passed around into the groove 19 prior to the retainer ring 17 being secured to the ring 14 and the angle member 11. Thus, in assembling the device the loop of the parachute line 20 is passed over the stud portion 24 into the groove 19 of the retainer member 17 and then the retainer member 17 is fastened to the ring 14 by suitable threaded fastening means passing into the threaded openings 18. The ring 14 and retainer member 17 are next secured to the angle member 11 by the screws 15. Thus, the entire stress on the parachute suspension lines is exerted on the bomb through the bolts 12.

The parachute lines 20 are secured to a parachute 21, which is shown in an expansible position in Fig. 1. It will be understood that the parachute is in a collapsed condition before the body 10 is dropped from the aircraft. An expansible truncated cone member 22 is also secured to the blunt end of the bomb 10 by the screws 15 passing through the cone member 22. The smaller end of the cone member extends away from the body 10 and, as seen in Fig. 1, the parachute 21 extends beyond the smaller end of the cone 22 but the exact distance that it extends is immaterial. It is only necessary that the parachute 21 extend a sufficient distance beyond the smaller end of the cone member 22 whereby the air from the parachute may be directed into the cone member 22 to inflate it. Thus, while the cone member 22 has been shown as not extending within the parachute 21, it will be understood that the smaller end of the cone member 22 may extend within the parachute 21 as long as it is spaced a sufficient distance from the top of the parachute to permit air from the parachute to be directed therein. In order for the smaller end of the cone member 22 to maintain its position with respect to the body 10 and the parachute 21, the smaller end of the cone member 22 is connected to the parachute 21 by a plurality of lines 23.

The cone member 22 is made of an air impervious member, which preferably consists of a strong nylon cloth having a rubber coating on the inside. It is desirable for the cloth to be able to withstand a force of approximately 300 pounds per inch. Since the cone member 22 is made of air impervious material, it will be observed that as long as the cone member 22 is inflated substantially no additional air is necessary to be directed thereinto. The lower end of the cone member 22 is substantially sealed against the angle member 11 by being fastened thereto by the threaded screws 15. Therefore, the cone member 22 becomes inflated as soon as the parachute 21 is inflated and remains inflated throughout the flight of the body 10 without any substantial amount of additional air being directed thereinto.

It will also be understood that additional stabilizing fins could be provided on the cone, if desired. Similarly, stabilizing fins could be added to the body 10, if desired.

An advantage of this invention is that it substantially increases the carrying capacity of the bomb bay for stabilized bombs since no rigid stabilizing apparatus is employed. Another advantage of this invention is that it eliminates the increased bulk and weight resulting when metal fairings are used behind bombs. A further advantage of this invention is that it improves impact speed and stability of a bomb.

For purposes of exemplification, a particular embodiment of the invention has been shown and described according to the best possible understanding thereof. However, it will be apparent that changes and modifications in the arrangement and construction of parts thereof may be resorted to without departing from the true spirit and scope of the invention.

I claim:

1. A device adapted for dropping from an aircraft comprising a body portion, an open ended truncated expansible cone member having its larger end secured to one end of the body portion and closed thereby, and a parachute secured to the one end of the body portion, said parachute extending beyond the smaller end of the cone member when inflated to inflate the cone member to aid the parachute in stabilizing the body portion.

2. Apparatus for stabilizing a body after being dropped from an aircraft including an open end truncated cone secured at its larger end to the body and closed thereby and a parachute secured to the body and extending a greater distance from the body than the smaller end of the cone to direct air into the cone to maintain the cone inflated during the fall of the body.

3. Stabilizing apparatus for a body dropped from an aircraft including an expansible member having one end secured to one end of the body, the end of said expansible member remote from said one end being open, and a parachute secured to the one end of the body and extending a greater distance from the one end of the body than the expansible member to direct air into the expansible member to inflate it during the body's fall to stabilize the body's fall.

4. Stabilizing apparatus according to claim 3 in which the expansible member is made of an air impervious material.

5. A device adapted for dropping from an aircraft comprising a body portion, a truncated expansible cone member having its larger end secured to one end of the body portion, the larger end of the expansible cone member being closed and the smaller end of the expansible cone member being open, and a parachute secured to the one end of the body portion, said parachute extending beyond the smaller end of the cone member when inflated to inflate the cone member to aid the parachute in stabilizing the body portion.

References Cited in the file of this patent

UNITED STATES PATENTS

| | | |
|---|---|---|
| 1,308,375 | Satre | July 1, 1919 |
| 1,499,266 | Vieregg | June 24, 1924 |
| 2,196,947 | Swofford | Apr. 9, 1940 |
| 2,365,230 | Volf | Dec. 19, 1944 |
| 2,715,872 | Klas | Aug. 23, 1955 |

FOREIGN PATENTS

| | | |
|---|---|---|
| 576,069 | France | May 5, 1924 |